United States Patent [19]
Browning

[11] Patent Number: 5,033,028
[45] Date of Patent: Jul. 16, 1991

[54] REACTION MASS ACTUATOR

[75] Inventor: Douglas R. Browning, Berkeley Heights, N.J.

[73] Assignee: AT&T Bell Laboratories, Murray Hill, N.J.

[21] Appl. No.: 457,654

[22] Filed: Dec. 27, 1989

[51] Int. Cl.$^5$ .......................... H04K 3/00; H04B 11/00
[52] U.S. Cl. .......................................... 367/1; 367/191; 310/111
[58] Field of Search .................... 367/1, 168, 176, 190, 367/191, 901; 181/0.5; 248/638; 310/111

[56] References Cited
U.S. PATENT DOCUMENTS
4,352,039  9/1982  Hagood et al. ..................... 310/328

OTHER PUBLICATIONS
*Mechanical Vibration and Shock Measurements* (Oct. 1980), by J. T. Boch, pp. 238-239.

Primary Examiner—Brian S. Steinberger
Attorney, Agent, or Firm—Charles E. Graves

[57] ABSTRACT

This disclosure describes apparatus and method for overcoming stroke limitations of moving coil reaction-mass vibration dampers, by recovering armature stroke displacement. The coil housing is selectively coupled or de-coupled to the vibrating structure. If, when the armature reaches its travel limit, sufficient damping energy has not been applied to the structure, the coil-housing assembly is decoupled from the structure while the armature is pulsed back to its zero displacement position. The housing then is re-coupled to the surface, having displaced some determinable distance from its previous location relative to the surface. Additional armature movement in the same direction as the previous armature stroke is applied, thereby generating the needed additional damping force. The resetting of the housing to its normal position vis-a-vis the vibrating structure can occur at a selected time in the damping force-generating cycle when reset does not impart an undesired reaction to the vibrating structure. In one implementation, a pair of moving-coil actuators counter-drive the vibrating structure; in another, a multiplicity of additional reaction-mass actuators are used.

5 Claims, 9 Drawing Sheets

POINT DURING SAMPLE PERIOD WHEN ARMATURE REACHED STROKE LIMIT. NO FORCE IS TRANSMITTED SINCE ARMATURE REMAINS AT STROKE LIMIT. FORCE IS TRANSMITTED WHEN ACTUATOR SIGNAL CALLS FOR A FORCE IN OPPOSITE DIRECTION.

$\Delta T$ = CONTROL SYSTEM SAMPLE PERIOD

FORCE vs. TIME PLOT

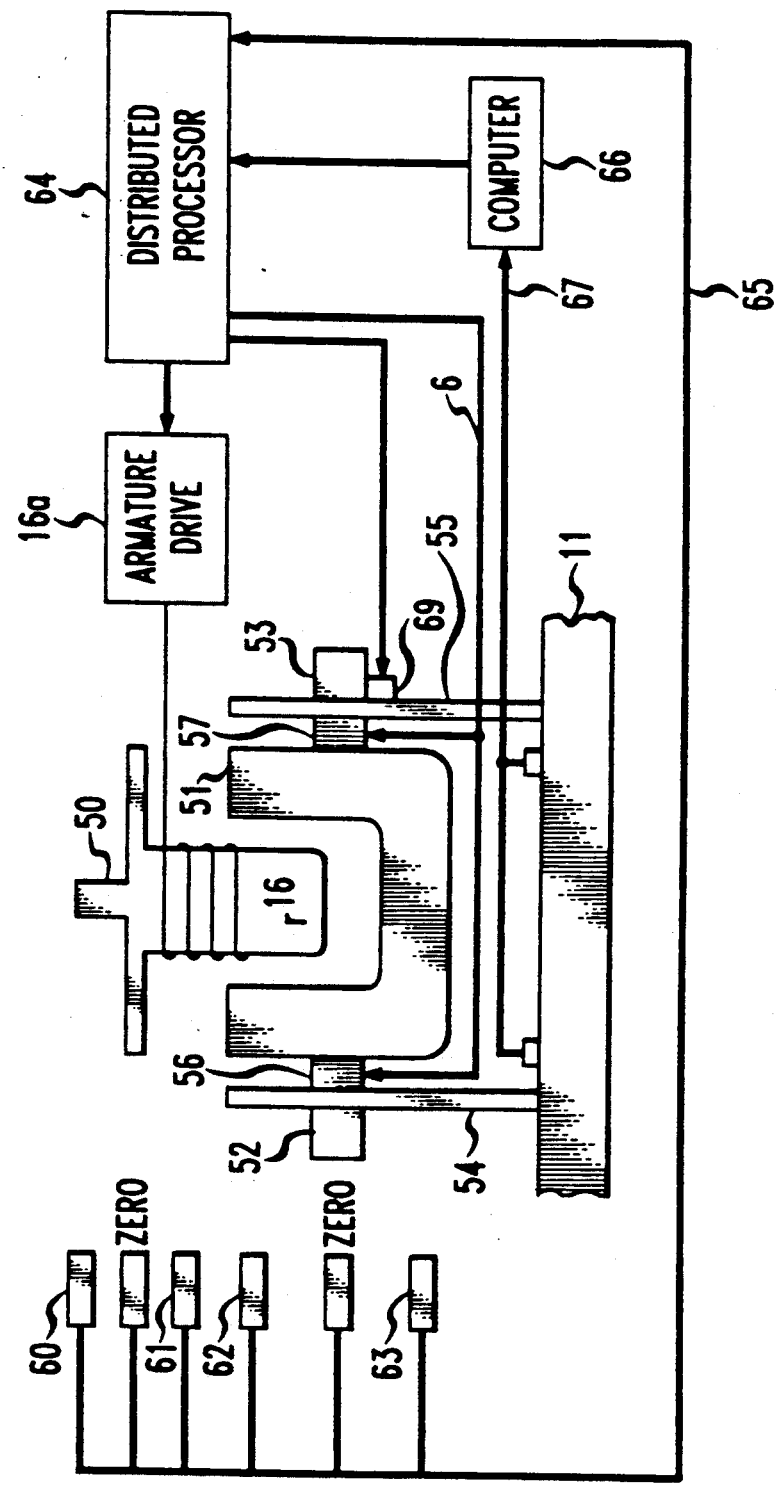

REACTION MASS ACTUATOR

This invention relates to vibration containment devices; and more particularly to a system for providing more reliable and fast-acting mechanisms for effectively reducing vibrational energy in relatively massive structures.

BACKGROUND OF THE INVENTION

Most structural vibrational energy is undesirable because it contributes, for example, to structural failure due to metal fatigue; to human discomfort levels; or to the generation of unwanted acoustic energy. The containment or dampening of vibrational energy particularly in metallic structures therefore is of substantial interest both in the structural design process, and also during the operational lifetime of structures to address unanticipated vibration energy conditions.

Unwanted acoustic energy is a particular problem arising in various ocean subsurface operating contexts. For example, the detection of desired signals propagating in the water is more difficult if in the same environment vibrational energy adds noise and interference.

One approach to lessening vibrational energy is to apply counter-vibrations to the vibrating member. The approach often is implemented by an actuator which applies forces on the structure in synchronization with, but counter to, the internal energy.

Several methods of applying the actuating forces are practiced in the prior art. These include grounded actuators, intrastructural actuators, and external reaction mass actuators. An example of the latter is the moving coil actuator, a description of which is contained in the *Mechanical Vibration and Shock Measurements*, Bruel and Kjaer, p. 239 et.seq. published by K. Larson and Son.

In conventional digital vibration cancellation using moving coil actuators, a controller performs the function of calculating an actuator force value to be applied to a vibrating structure's surface over a determined time interval. The force is generated by imparting a specific acceleration to the armature, or stepped acceleration increment, sufficient to generate counter-forces to offset or counter the structure's vibrational displacements. The calculation is based inter alia upon displacement data from sensors located on the structure. In certain applications the instantaneous position of the armature in its duty cycle may also be incorporated in this calculation. By way of example, at a point in the duty cycle when the armature is in its zero displacement position, the controller energizes the armature coil to provide a first acceleration to the armature. This acceleration creates an opposite acceleration in the armature housing, which causes a displacement of the structure to which the housing is coupled, in a direction counter to the instantaneous displacement occurring in the structure due to vibration.

The armature may be accelerated further in the next force-application time slot. If the armature is positioned a sufficient distance from its approaching positive stroke limit, the controller's command for an additional acceleration can be executed. If, however, the armature is too close to its positive stroke limit, the armature will not have sufficient travel left to deliver the additional force.

Stroke limitations of the type described constrain the utility of current reaction-mass actuators, regardless of size or shape. One consequence is that existing moving coil reaction-mass actuators with unmonitored armatures can generate essentially unpredictable and thus unreliable actuating forces in many operating conditions. Unreliability, particularly during the occurrence of transients prior to control system convergence, can effectively defeat a vibration dampening objective. Another consequence is the stroke limit constraint on frequency response and associated deliverable peak force for application of periodic forces to the attached structure. For example, the stroke limit and a desired periodic peak force to be delivered to the structure via the actuator determines the lowest frequency waveform capable of being applied. Should a greater peak force be desired from the same device, the lower frequency limit must be raised to prevent the armature from reaching its stroke limits. Conversely, lowering the expected peak force will expand the usable frequency range.

OBJECTS OF THE INVENTION

Accordingly, one object of the invention is to reduce vibrational energy in a structure by more effectively timed application of counterforce. Another object of the invention is to precisely time the applications of counterforces delivered to a vibrating member.

A specific object of the invention is to overcome the limitations of stroke limitations of reaction-mass damping apparatus.

A particular object of the invention is to control the magnitude of acoustic energy imparted to an ocean environment by vibrations imparted by a roving vehicle such as a submarine or a sonar receiver platform.

SUMMARY OF THE INVENTION

The present invention overcomes the limitations of prior art moving coil actuators, by providing a more versatile means for delivering desired counter-forces to a vibrating surface. Pursuant to one aspect of the invention, stroke displacement limitations of the armature of a moving coil reaction-force system are overcome by providing a means for recovering armature stroke displacement, particularly when the armature reaches its travel limit. Advantageously, the invention also provides a way to recover armature stroke displacement without imparting an undesirable opposite force to the vibrating structure.

While the invention may be incorporated in a single reaction-mass actuator device, the invention has added utility when incorporated in multiple actuator systems. In a simple implementation of the invention, a single additional moving-coil actuator is included for counter-driving the vibrating structure. The two devices are driven by the controller alternately. Thus, while one is returning (or driven) to its at-rest or zero position, the other may be activated to deliver to the structure a desired force in a desired direction, besides the utility of the arrangement itself, added counterforce-generating advantage for the same stroke length may be gained.

In a further embodiment of the invention, a multiplicity of additional reaction-mass actuators are used, either successively or in some other sequence. Here, a phase relationship of the individual actuators may be established or fixed at a predetermined set of values. The driving of individual actuators may be varied depending upon the complexity of the vibrational modes occurring in the member as detected by sensors. In this embodiment, the controller may be set to drive the various actuators in accordance with predetermined criteria or rules; or may drive actuators adaptively, again depending on the nature of the vibrational energy. The controller also applies the added counterforce mechanism of the present invention, and then resets the actuator mechanism in accordance with displacement information derived from sensors on the vibrating structure, timing the reset to occur when the reaction force generated by reset will oppose, rather than add to, vibrational displacement in the structure.

The invention teaches the determination of particular reaction-mass device configurations, and of when to begin applying counterforces through each one of the multiplicity of actuators. Particularly, the invention teaches that the time to reset or reposition the armature-housing system, following an invoking of the armature stroke recovery step, is when the reaction force generated during reset will contribute to vibration damping and not create an undesirable additive force on the vibrating structure.

IN THE DRAWING

Figure 4:
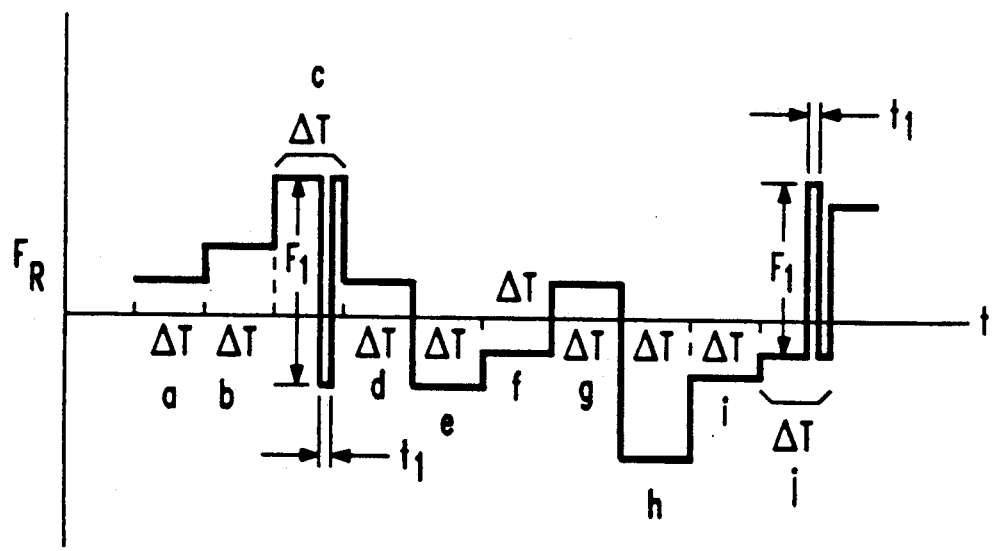
Figure 5:
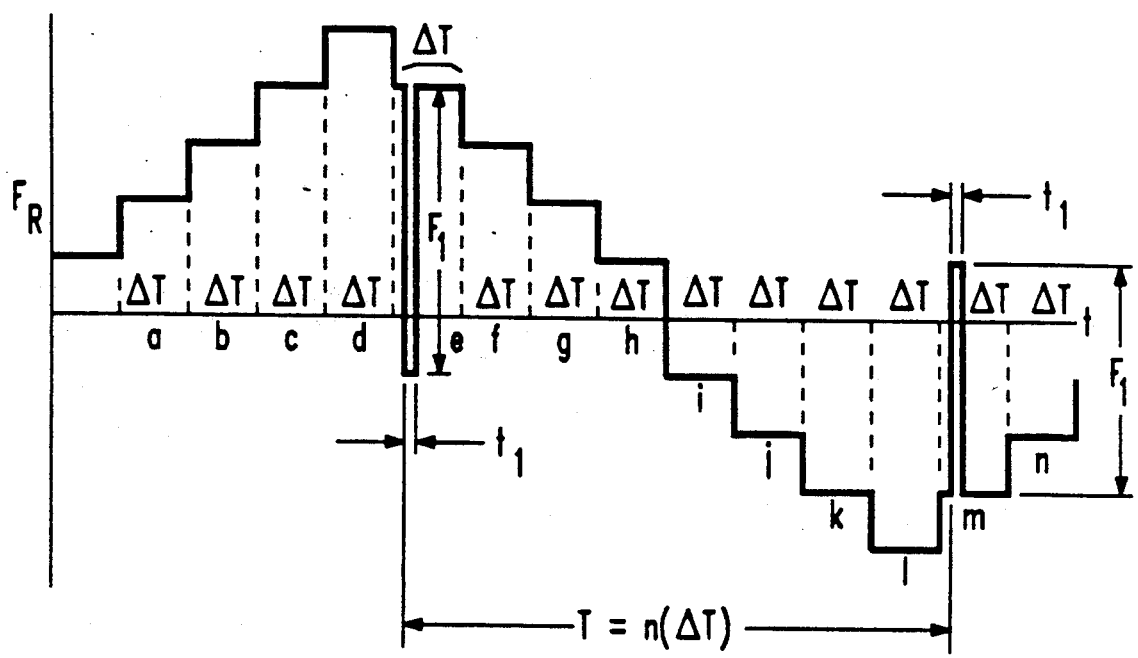
Figure 6:
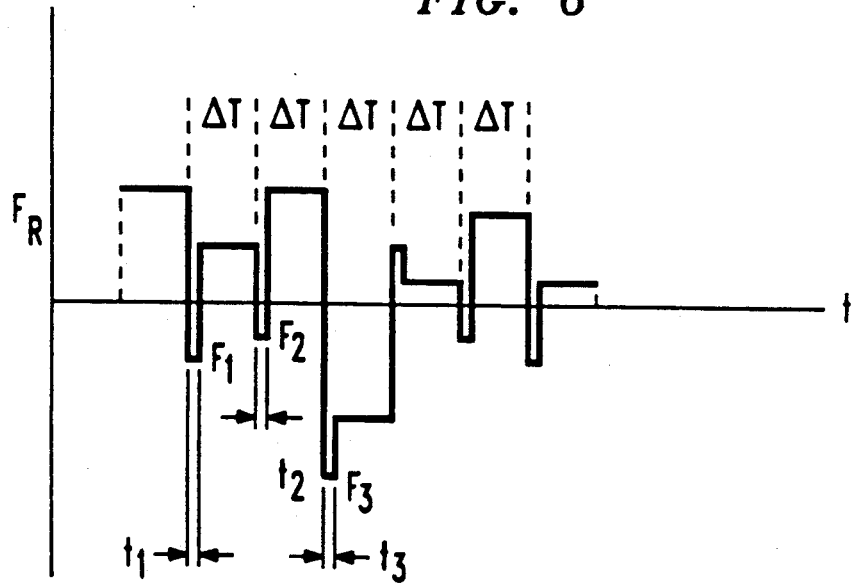
Figure 7:
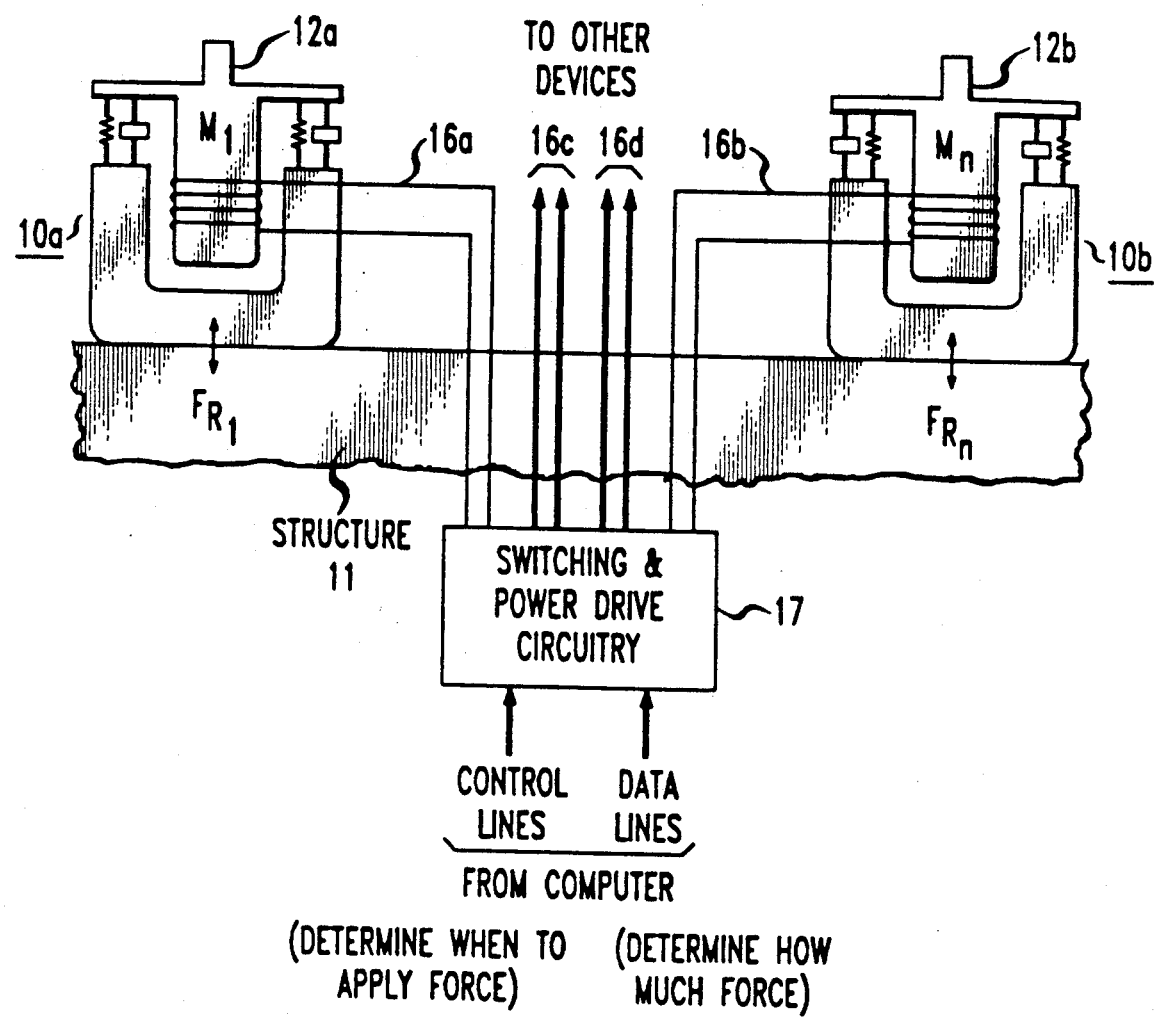
Figure 8:
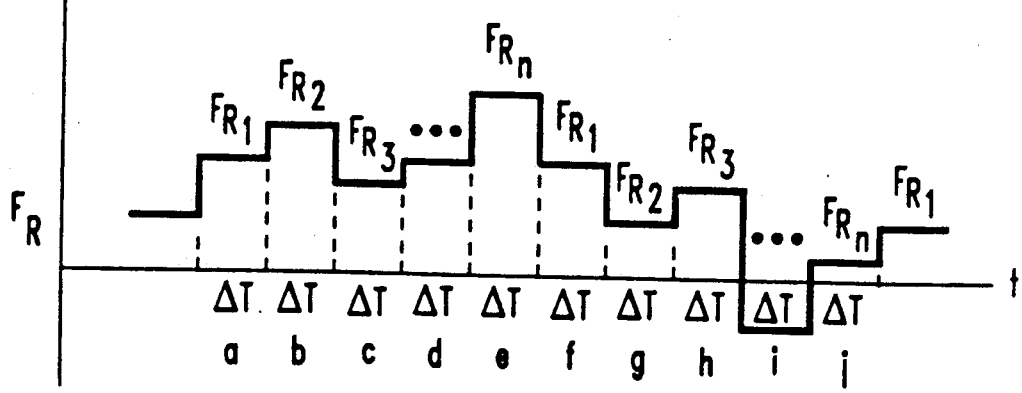
Figure 9:
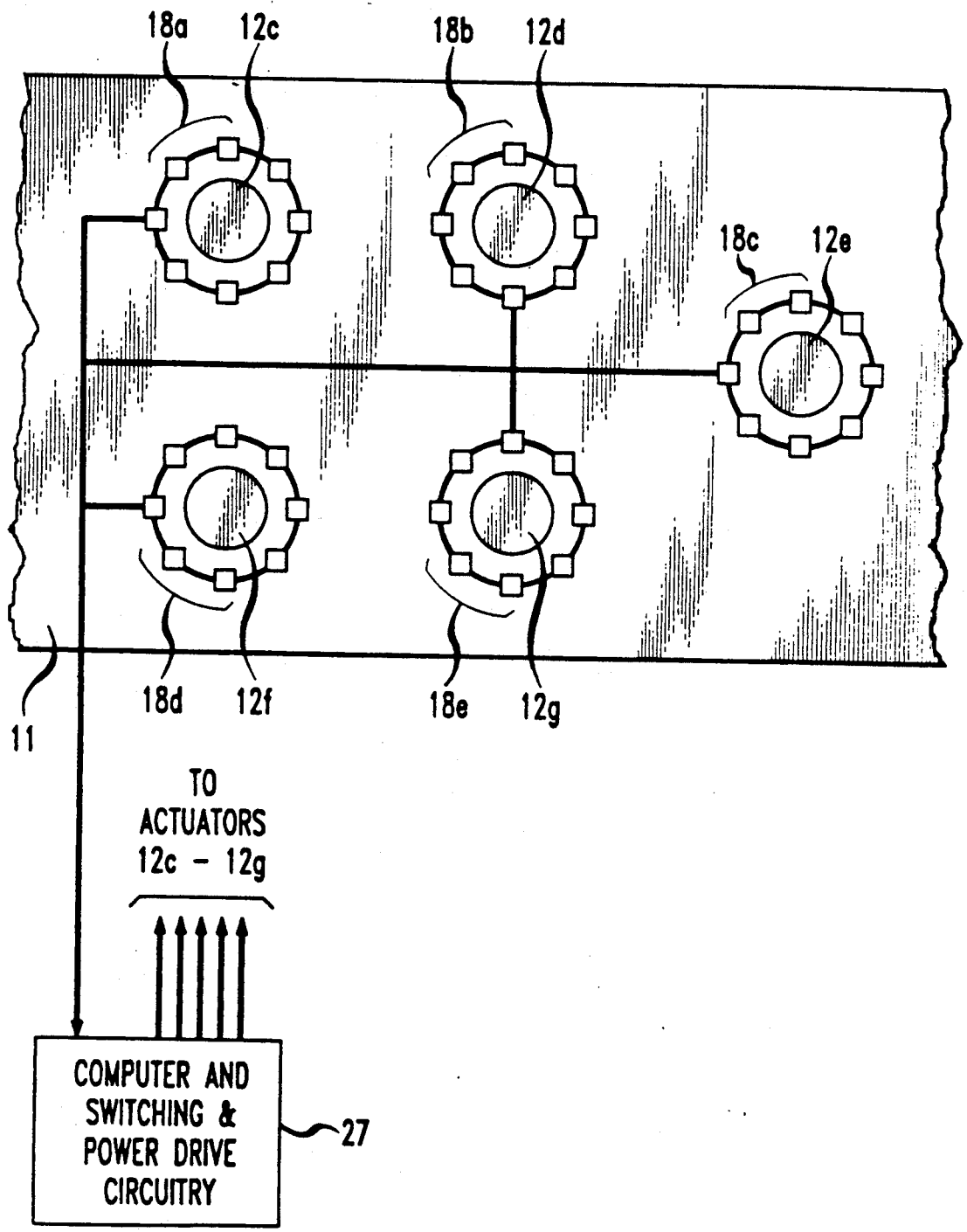

FIGS. 4–6 area graphs of armature force versus time with the armature being returned to zero displacement at various times;

FIG. 7 is a schematic drawing of a first embodiment of the invention using two actuators;

FIG. 8 is a graph of force versus time for the embodiment of FIG. 7;

FIG. 9 is a schematic diagram of an embodiment using plural actuators and sensors;

FIGS. 10–15 demonstrate pictorially apparatus and method for timing the resetting of the armature-housing assembly; and FIG. 16 is a high-level block diagram showing apparatus for practicing the concepts portrayed in FIGS. 10–15.

DETAILED DESCRIPTION OF AN ILLUSTRATIVE EMBODIMENT

Figure 1:
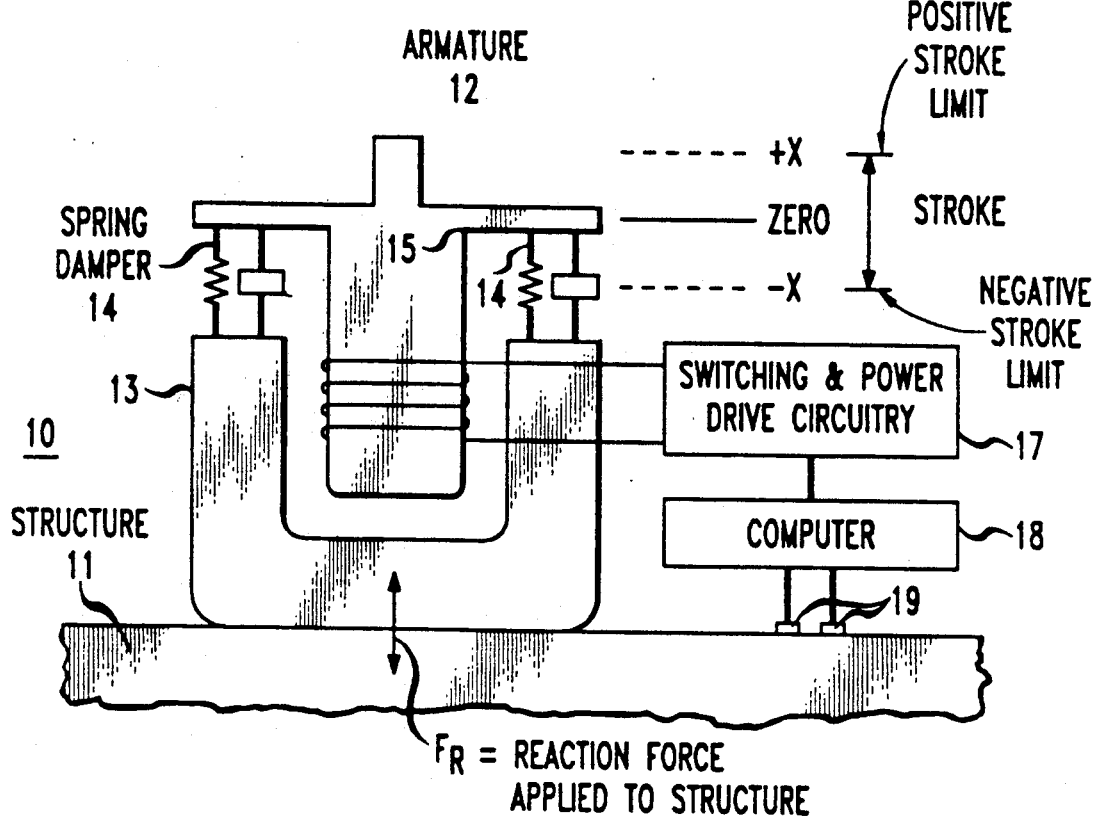
FIG. 1 is a schematic drawing of a conventional reaction-mass actuator.

FIG. 1 shows a conventional moving-coil electrodynamic actuator denoted 10, affixed to a vibrating structure 11. Actuator 10 consists of an armature 12, a U-shaped magnet 13 and springs and dampers 14 shown schematically. The magnetic component 15 of armature 12 is driven by integral windings 16 connected to a current source in the conventional switching and armature coil power drive circuit 17. Circuit 17 may be self-contained. Alternatively, circuit 17 may be controlled by a computer or microprocessor 18 which calculates a required force value to be applied to structure 11, based on data from accelerometer sensors 19. The data collection and processing will be more fully described below. The force is then applied by circuit 17, energizing the coil with a certain time-dependent current value.

Figure 2:
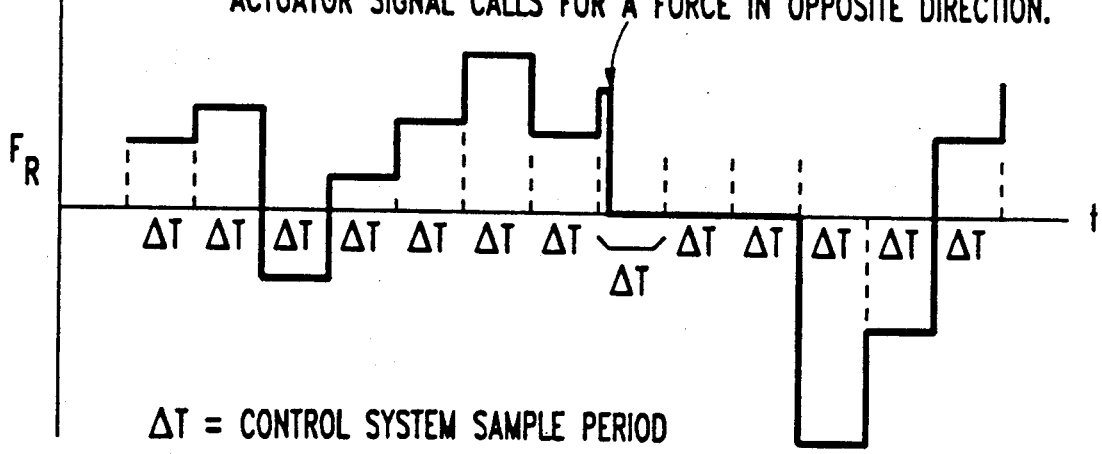
FIG. 2 is a graph of counter-force versus time.

A positive and a negative armature stroke limit is delineated around the "zero" position in FIG. 1. If armature 12 is positioned in its duty cycle too closely proximate to its stroke limit, the controller's command for an updated counterforce cannot be executed. This condition is illustrated by reference to FIG. 2, which shows a succession of the force-application time slots denoting the control system sample period denoted a through i, and various force levels ordered applied in each. For time slots a–g, armature 12 is positioned fortuitously at a point in its stroke which allows the requisite force levels to be generated over the entire time slot. Because of stroke position, however, in time slot h there occurs a point where the armature reaches its stroke limit at a time which is less than the time slot width; and as a result the requisite force is not delivered.

Figure 3:
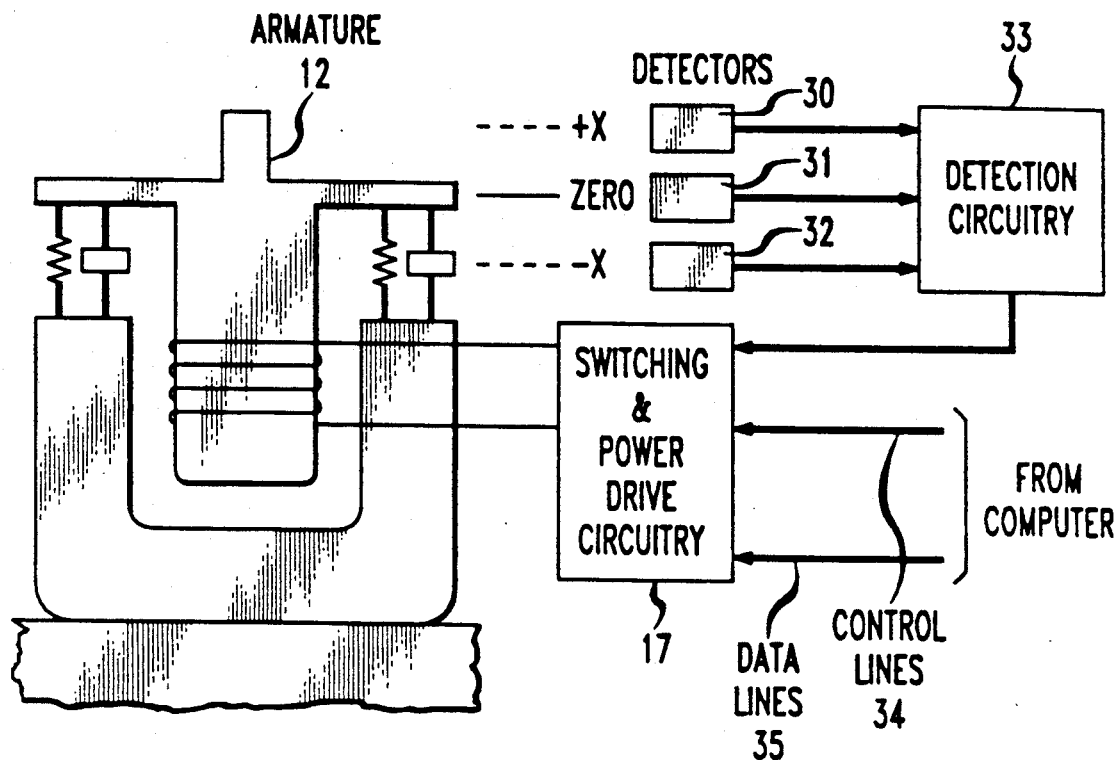
FIG. 3 is a schematic diagram of a variation of the FIG. 1 embodiment, showing armature position detectors.

Pursuant to one aspect of the invention, a more reliable and predictable counterforce may be generated by a moving coil reaction-mass actuator by detecting the displacements at which the armature is at its maximum travel, and then rapidly returning the armature to its zero displacement position. This scheme is illustrated in FIG. 3. Displacement detectors 30, 31, 32 detect that armature 12 has reached its maximum positive, zero and maximum negative displacement points. Detection circuitry 33 feeds this data into the switching and power drive circuitry 17. Control lines 34 determines the sample period (delta-t in FIG. 3, for example); and transmit from the computer 18 a signal determining when the counterforce will be applied. Line 35 transmits a signal indicating how much force is to be delivered. These controls also return armature 12 to its zero position.

One method for returning the armature 12 to its zero position uses all three detectors 30, 31, and 32 to identify when armature 12 has reached its maximum stroke position. The solution is based on the concept of returning the armature to its zero position in a time period much shorter than the control system sample period. The armature 12 at first is driven with a first acceleration in time slot a, and a second, greater acceleration in time slot b, thereby causing a first reaction force and a second, greater force for time slot b. Sensing a maximum positive stroke occurring in time slot circuit 17 applies a current to the armature coil sufficient to generate a negative force denoted F1 to drive armature 12 rapidly back to its zero displacement point, in a relatively brief time denoted T1 in FIG. 4. At this point, circuit 17 applies a positive driving current to armature 12 causing it to accelerate sufficiently to create a positive force F1. In time slot d, the current is reduced to armature 12, causing a lesser acceleration and a commensurately lesser reaction force.

The graph of FIG. 5 illustrates that the capability to return an armature to a zero displacement can help create a periodic force-time waveform without effective discontinuities and with a peak amplitude greater than possible with an uncompensated reaction-mass device, all else being equal. As in the previous example, at some point in the force application sequence—here, in time slots e and m—the armature reaches its maximum displacement. In slot e the armature is returned from its maximum positive stroke to zero; and, in slot m, from its maximum negative displacement to zero. From the zero point, the armature is accelerated to again deliver a force, which was interrupted by the maximum stroke limitation.

The graph of FIG. 6 depicts a method for returning armature 12 to zero by detecting only the zero-position through detector 31. In this embodiment, after each sample period the armature 12 is driven back by current from circuit 17 to zero in a time period which is much shorter than the control system sample periods delta-t. Since the armature starts from its zero displacement point in building the acceleration forces, there is complete availability of the maximum stroke length for generating the needed reaction forces. In this case, the return to zero pulse becomes periodic with a variable return force magnitude, F1, and variable return time, t. FIG. 6 illustrates the idea for a transient waveform. For periodic force waveforms, the return force and return time, again, are periodic. The return force magnitude sequence will also be periodic, that is, forces F1, F2, F3, etc. will repeat.

For the examples of FIGS. 3-6 above, the effects which the abruptly returning actuator 12 may have on the structure's vibrational behavior, need to be determined in a given case. In general, however, the near-spike return force can be negated or minimized for its effect on the vibrating structure, or can be handled without detracting from the ultimate objective of reducing the vibrational energy of the structure.

An approach to avoiding the generation of an undesired counter-force is illustrated below, with reference to FIGS. 10-16. An armature 50 travels in a magnetic core housing 51. The actuating coil 16 is connected to armature driver 16a. Spring connections between housing 50 and armature 50 are omitted for clarity. Arms 52, 53 extend laterally from housing 51 for slidably mounting housing 51 on two rails 54, 55. Arms 52, 53 include conventional braking mechanisms depicted schematically as elements 56, 57, which grip or release slides 54, 55. Accelerometers 58, 59 are fastened to vibrating structure 11. Position sensors 61, 62 detect when armature 50 has reached its maximum positive and negative excursions respectively. Position sensors 62, 63 detect when housing 51 has reached its maximum positive and negative excursions. Information from sensors 60, 61, 62, and 63 is transmitted to a distributed processor 64 through connecting line 65. Information from displacement sensors 58, 59 is transmitted to a control computer 66 via line 67. The gripping and releasing of the slides 54, 55 by brakes 56, 57 are controlled by processor 64 through line 68.

Figure 10:
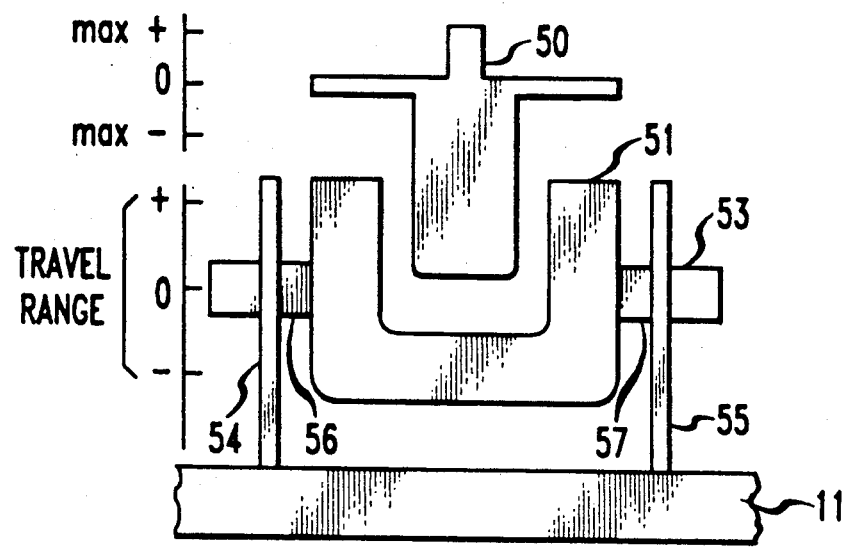

The invention teaches that the time to reset or reposition the armature-housing system following an invoking of the armature stroke recovery step, is when the reaction force generated during reset will contribute to vibration damping. This feature is now illustrated. FIG. 10 shows armature 50 at rest at its zero displacement position with respect to housing 51. Housing 51 is designed to travel on slides 54, 55 in a range bounded by the plus and minus positions shown; and in FIG. 10 is at its mid-point position with respect to surface 11, and locked onto slides 54, 55 by action of brakes 56, 57.

Figure 11:
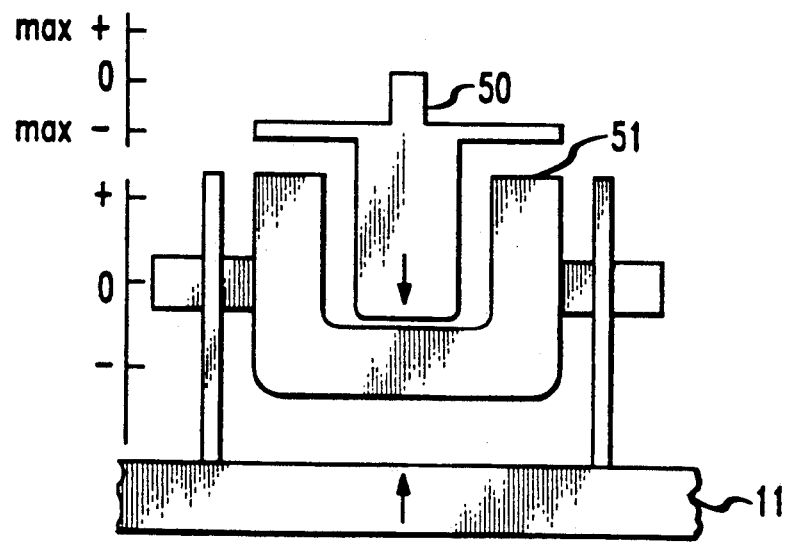
Figure 12:
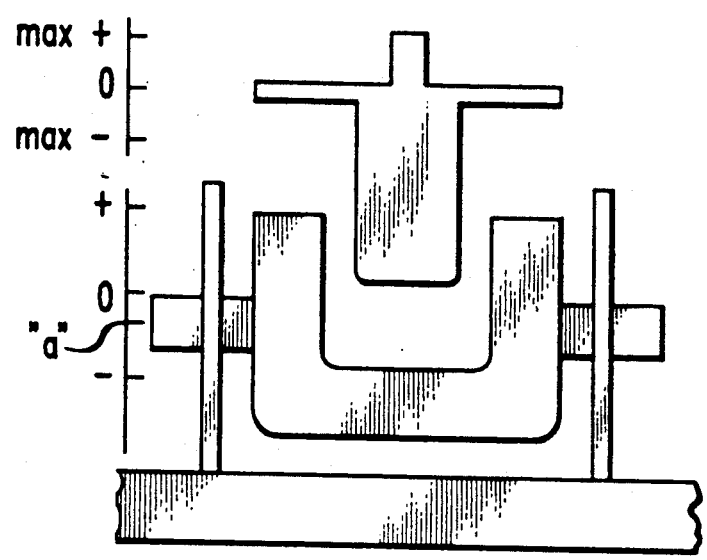

FIG. 11 shows armature 50 in its maximum negative displacement position, having been accelerated by selective energizing of its coils by drive 16a under control of processor 64. In accelerating, armature 50 imparted a positive force on structure 11, which in accordance with a damping strategy determined in processor 64 countered a negative-going vibrational displacement. It is assumed, however, that additional force must be applied through further movement of armature in the negative direction because the just-delivered force was insufficient to eliminate all of the negative displacement of structure 11. Pursuant to the invention, brakes 56, 57 are released, freeing housing from slides 54, 55. An appropriate pulse of current is delivered through windings 16 to armature 50 to drive it back to its zero displacement position. Housing 51 in this process is driven by the laws of physics in an opposite direction, coming to rest at a position denoted a in FIG. 12. Because housing 51 and armature 50 were decoupled from slides during this interval, the reactive motion generated for housing 51 is not applied to structure 11, an advantage since the latter force would cause a displacement of structure 11 that would be in the direction opposite to that needed to dampen the current displacement of structure 11. When housing 51 reaches its reaction travel point a, brakes are applied to lock the housing again onto slides 54, 55. By appropriately pressurizing and venting a fluid boundary (not shown) between structure 11 and housing 51, the effect of gravity on the housing assembly, when mounted vertically, may be mitigated.

Figure 13:
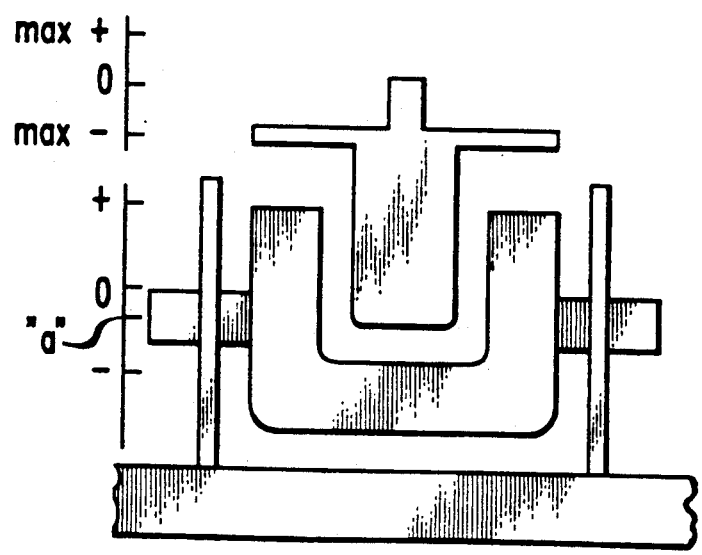

As seen in FIG. 13, armature 50 is driven in a negative direction, to exert the necessary additional positive force on structure 11, thereby to counter the remaining negative displacement present at that instant. Armature 50 comes to rest in its negative excursion mid-way between its zero point and its maximum negative displacement point.

Figure 14:
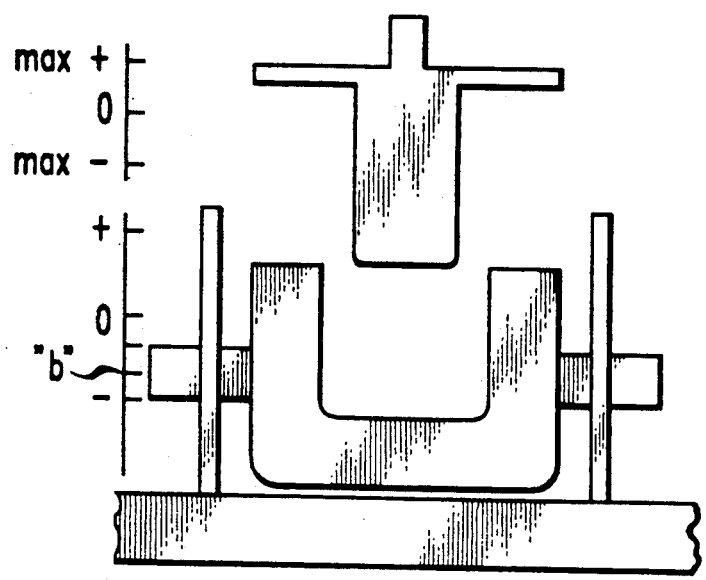
Figure 15:
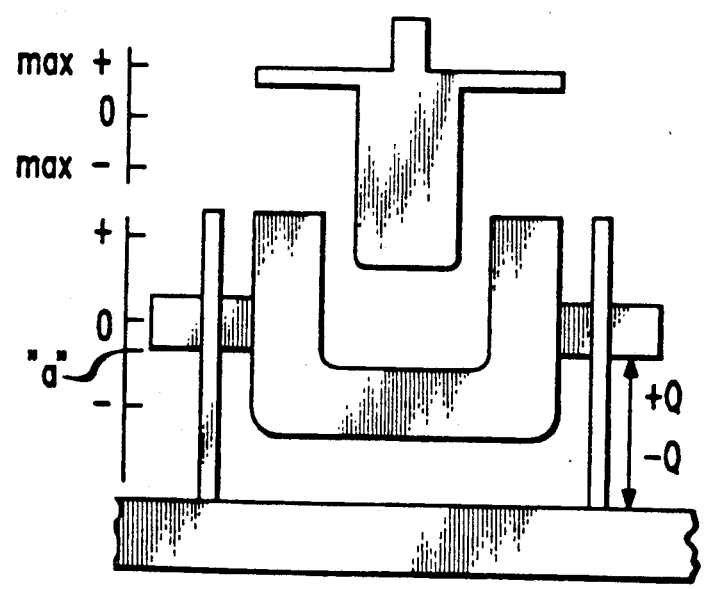

As seen in FIG. 14, with the instant force application completed, housing 51 is again disengaged from slides 54, 55; and armature 50 is pulsed to another "ready" position, this one being midway between its maximum positive displacement and its zero point. In this process, housing 51 again travles reactively in a negative direction along the slides, coming to rest at point b as seen in FIG. 14.

Computer 66 receives displacement information from the sensors 58, 59 on the surface of structure 11. Pursuant to the invention, computer 66 monitors the displacement information to determine a time when structure 11 is displacing, due to its vibrational motion, in a positive direction, and forwards the information to processor 64. At this time, a reset means such as a stepping motor denoted 69 in FIG. 16 controlled by processor 64 is actuated. Motor 64 operating by friction gripping or by engaging cogs in slide 55 (not shown) drives housing 51 back to its midpoint position. The negative reactive force imparted to slide 55 by the acceleration of housing 51 and its armature 50, denoted "−Q", advantageously counters the positive displacement experienced by the surface of structure 11. For supplying periodic force waveforms to the structure 11, housing 51 displacements to the return action will on the average be zero; thereby, not requiring a means of realigning the housing to zero.

Returning now to a further application of the present invention depicted in FIG. 7, two moving coil devices 10a, i are affixed to the structure 11 and driven by connections 16a, i to drive circuit 17. More devices may be utilized, as in the embodiment of FIG. 9, by additional connections such as 16c, i. In a succession of force-application time slot sample periods denoted a–i in FIG. 8, various accelerations are applied to the armatures. Resultant force levels are applied to the structure. The forces are alternately applied, first through one armature and then through the other. While armature 12a is returning to its at-rest position, armature 12b is activated to deliver the desired force in the desired direction. By use of two or more armatures generating forces designed to counter the vibrational displacements of structure 11, a greater amount of latitude both for applying counterforces more constantly and for resetting the armatures when deliberately overdriven, can be achieved.

The invention may be practiced using a multiplicity of pairs of reaction-mass actuators. Shown in FIG. 9 are several actuators denoted 12c, 12d, 12e, 12f, and 12g fastened to a vibrating structure 11 at selected points. The actuators 12c, 12d comprise a pair, as do actuators 12f, 12g. The signal actuator 12e can act alone, or can be paired as needed with a neighbor in a rearrangement of pairings.

Near the same selected points are disposed one or more displacement sensors or sensor groups 18a, 18b, 18c, 18d, and 18e. The sensors are connected to a unit 27, which combines switch and power drive circuitry of element 17 and the computing function of element 18 of FIG. 1. With the structure 11 in a state of vibration and the system energized, data on displacement of the structure is collected by the sensor groups 18a–i. The displacement data is recorded and stored in a buffer (not shown) as a function of time. From the stored displacement data, the instantaneous displacement data for the structure near each actuator at specified time intervals is calculated, to capture the physical indicia of the undesired vibrations or movements of the structure through selected samples of actual displacement. Based on the most recent displacement data, a set of predicted instantaneous displacements is now calculated for each monitored point at which the reaction-mass actuators are fixed. The prediction of displacement for each such point may be accurately based simply upon an analysis of the generated displacement data alone. However, the displacement prediction data in cases of complex vibrational patterns or in cases where multiple energy sources are affecting surface displacement, can also be based on the relationships among important physical parameters and/or the energy sources. The factors will include, for example, the mass or weight of the structure; the frequency and amplitude of vibrational energy manifested as displacement at each point and the variability (if any) with time of the frequency and amplitude behavior; the accelerations if any being experienced by the structure; and the loads on the structure as manifested in stresses and strains. For the most part, the composite waveform for relatively massive waveforms will exhibit a recurring and relatively low-level base frequency. That frequency will be the main determinant of how long each individual actuator will have to be driven in a given direction over successive time slots to counter the displacement occurring. The values of each variable are known or can be calculated. The displacement prediction algorithm used in each particular case preferably is one which experience teaches is relatively accurate in its estimates of displacements. The algorithm preferably will include the capability taught by the present invention to reset any fully-traveled armature to a lesser displacement and then drive the vibrating surface with further accelerations of the armature in the same direction; and will include the capability to reset the armature and housing apparatus back to the housing's neutral position with respect to the structure, without at that time imparting a reactive force of the wrong direction to the structure.

The invention may be practiced in many additional forms which will be evident to persons skilled in the art.

I claim:

1. Apparatus for imparting vibration damping forces to a structure, comprising:
   a moving coil reaction-mass actuator comprising: a housing and an armature movable within said housing between maximum and minimum displacement points;
   means for vertically positioning said housing with respect to said structure within a permitted displacement range;
   means for sensing the relative positions of said armature and said housing, and also of said housing and said structure;
   means for detecting displacements of a vibrating surface of said structure;
   means responsive to indicia from said sensing means and from said detecting means for selectively mechanically coupling and decoupling said housing to said structure when disposed within said vertical range;
   means responsive to sensing the arrival of said armature at its said maximum or minimum displacement point for decoupling said housing and said structure, and for returning said armature to a selected new displacement position;
   said housing thereby repositioning itself from a first point in its travel range to a second point; and
   means responsive to arrival of said armature at its said new position for re-coupling said housing and said structure for driving said armature in the same direction as in the previous drive stroke.

2. Apparatus in accordance with claim 1, further comprising:
   means responsive to the detection of vibrational displacement of said structure surface for resetting said housing to said first point in its said travel range at a time when reset movement opposes said vibrational displacement of said structure.

3. Apparatus in accordance with claim 2, wherein said apparatus comprises multiple reaction-mass actuators.

4. Apparatus in accordance with claim 2, wherein said apparatus comprises multiple pairs of reaction-mass actuators.

5. Apparatus for imparting vibration-damping forces to a vibrating structure, comprising:
   a moving coil reaction-mass actuator comprising: a housing and an armature movable within said housing between maximum and minimum displacement points;
   means for mounting said housing on a surface of said structure for relative movement of said housing with respect to said surface within a predetermined range of distances from said surface;
   means for sensing the relative positions of said armature and said housing, and also of said housing and said surface;
   means for detecting vibrational displacements of said surface;
   means responsive to indicia of said vibrational displacements for driving said armature with a substantially uniform periodicity;
   means for driving said armature in responsive to said vibrations of said surface;
   means responsive to indicia from said sensing means and from said detecting means for selectively mechanically coupling and decoupling said housing;
   means including said driving means responsive to sensing the arrival of said armature at its maximum or minimum displacement points for decoupling said housing from said structure, and for moving said armature to a selected new displacement position in a time that is less than the interval of said uniform periodicity;
   said housing thereby reactively repositioning itself from a first point in its travel range to a second point; and
   means responsive to arrival of said armature at its said new position for re-coupling said housing and said structure.